United States Patent [19]

Kato

[11] Patent Number: 5,739,963
[45] Date of Patent: Apr. 14, 1998

[54] LENS ASSEMBLY

[75] Inventor: Takashi Kato, Sakai, Japan

[73] Assignee: Minolta Co., Ltd., Osaka, Japan

[21] Appl. No.: 695,877

[22] Filed: Aug. 12, 1996

[30] Foreign Application Priority Data

Aug. 21, 1995 [JP] Japan .................................. 7-211806

[51] Int. Cl.$^6$ ............................................. G02B 15/14
[52] U.S. Cl. ............................................. 359/704; 359/702
[58] Field of Search ................................. 359/704, 702, 359/826, 827, 828

[56] References Cited

U.S. PATENT DOCUMENTS 4,154,510  5/1979  Katagiri .................................. 359/704
4,737,017  4/1988  Nagasaka .............................. 359/811

FOREIGN PATENT DOCUMENTS 02201307A  8/1990  Japan .

*Primary Examiner*—David C. Nelms
*Assistant Examiner*—Ricky Mack
*Attorney, Agent, or Firm*—Burns, Doane, Swecker & Mathis, LLP

[57] ABSTRACT

For the purpose of providing a lens assembly for connecting a cam ring and an advance guide barrel by a simple construction without increasing the overall length, a connector having a protrusion extending to the interior side in the radius direction is formed on the posterior end of a cam ring provided with a cam channel of predetermined configuration on a barrel-like body. From the connector side, a cam ring engages an advance guide barrel provided with guide channels. Although the connector is flexed as the protrusion abuts the exterior surface of the advance guide barrel at this time, said connector is restored to its original position when the protrusion arrives at the endface of the advance guide barrel. Thus, the protrusion engages the endface of the advance guide barrel, and the cam ring engages the advance guide barrel.

31 Claims, 6 Drawing Sheets

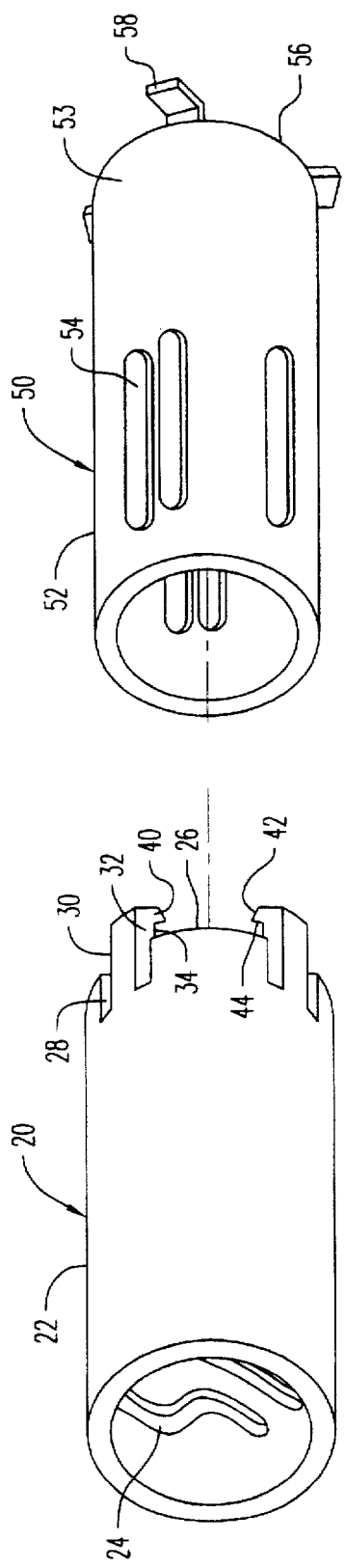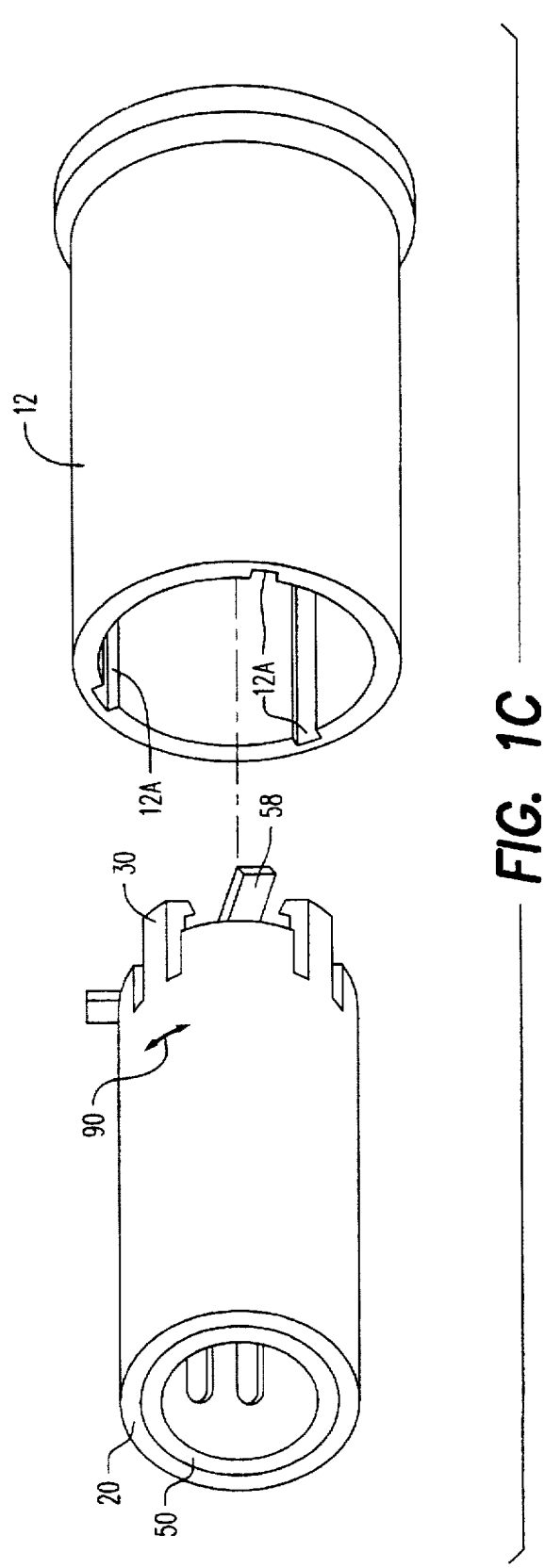
FIG. 1A  FIG. 1B  FIG. 1C

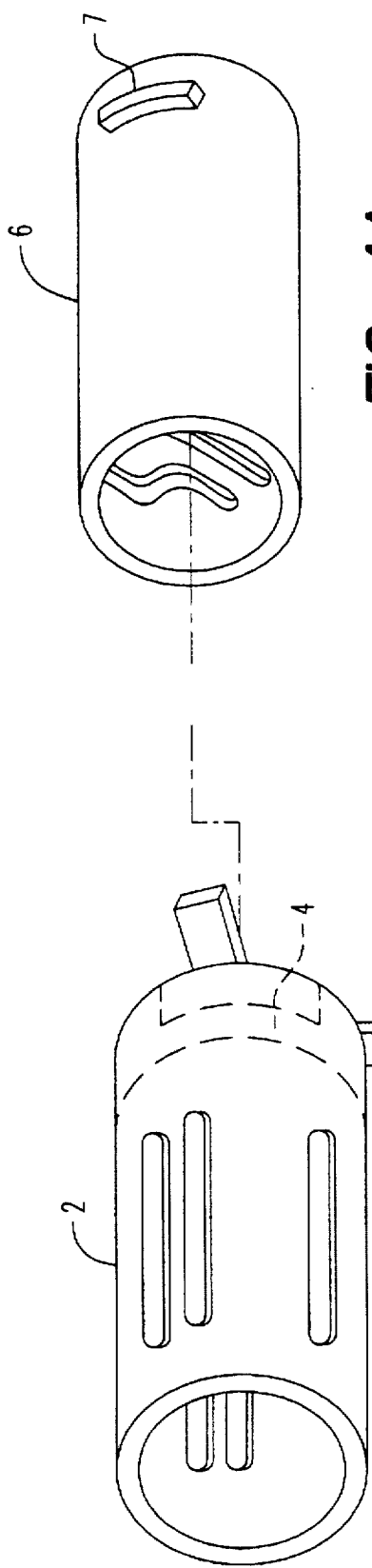
FIG. 4A (PRIOR ART)
FIG. 4B (PRIOR ART)
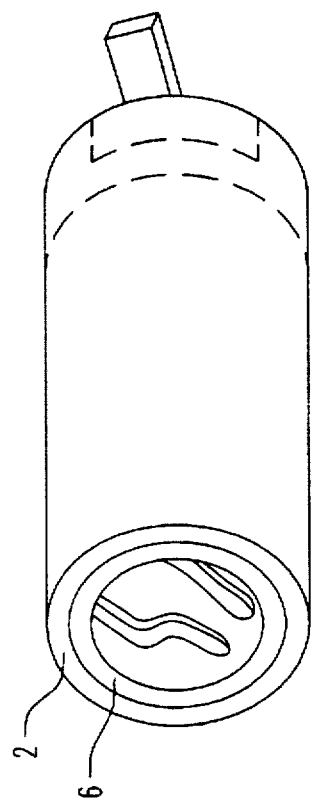
FIG. 4C (PRIOR ART)

PRIOR ART

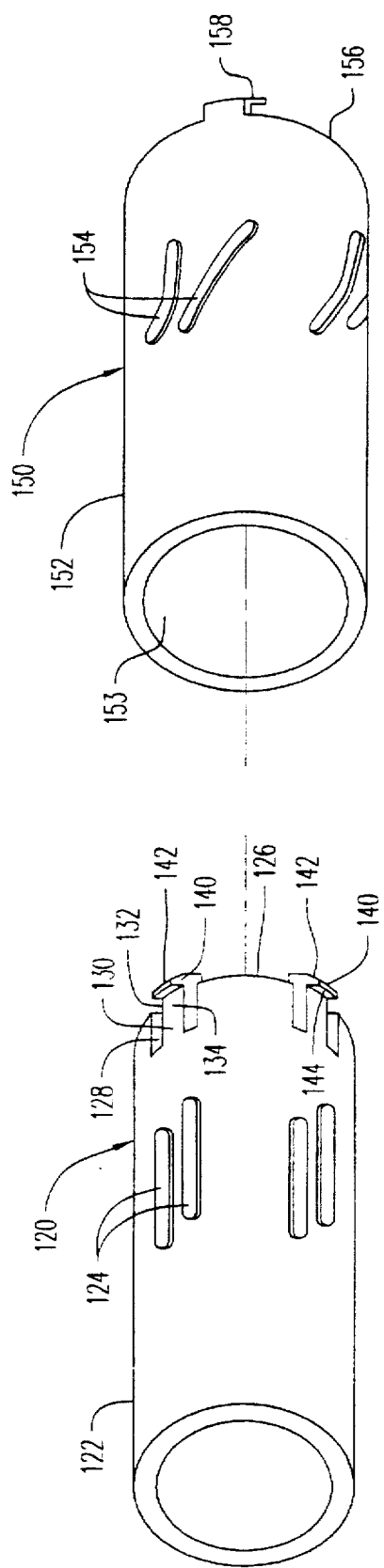
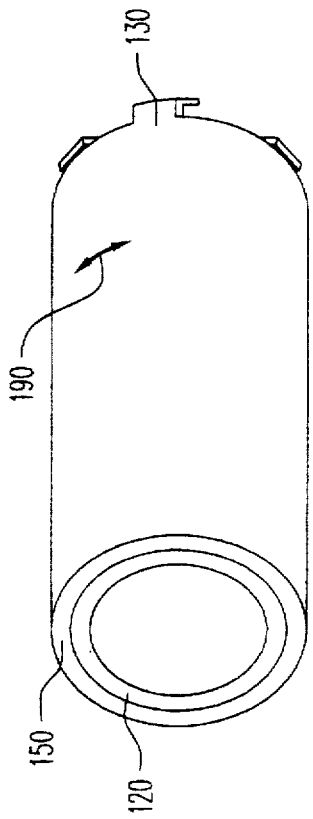
FIG. 6A
FIG. 6B
FIG. 6C

LENS ASSEMBLY

BACKGROUND OF THE INVENTION

1. Field of the Invention

The present invention relates to a lens assembly, and more specifically relates to a lens assembly comprising a construction combining two mutually engaging lens barrels.

2. Description of the Prior Art

Lens assemblies wherein two lens barrels are mutually engaged and both said lens barrels are relatively rotated are often used. For example, in a lens assembly a cam ring formed for a zooming cam used to move a lens unit is maintained on an advance guide barrel so as to be rotatable and regulate movement in the direction of the optical axis. Methods of connecting the cam ring and advance guide barrel typically use washers. In such methods, as shown in FIGS. 3A and 3D, movement of cam ring 6 in the axis direction is regulated by inlaying a cam ring 6 on the exterior surface of advance guide barrel 2 provided with a flange 3 at one end, and fixedly attaching a washer 8 to advance guide barrel 2 so as to hold cam ring 6 between flange 3 and washer 8. As shown in FIGS. 3B and 3E and the simplified view of FIGS. 4A–4C, for example, a bayonet member 7 is formed on the exterior surface at one end of cam ring 6, and a bayonet channel 4 is formed on the interior surface of advance guide barrel 2 to receive said bayonet member 7, such that cam ring 6 and advance guide barrel 2 can be connected so as to be rotatable by rotating cam ring 6 after inserting said cam ring 6 into advance guide barrel 2 to engage bayonet member 7 in bayonet channel 4. Since this method requires the formation of bayonet member 7 and bayonet channel 4 so as to allow engagement and disengagement of said members, the relative rotation angle between members 2 and 6 cannot be increased above a constant after said engagement. Another method uses a roller 9. In this method, as shown in the FIG. 3C, a roller 9 is fixedly attached to the exterior surface of advance guide barrel 2, and a channel 7 is formed on one edge of cam ring 6 such that channel 7 of cam ring 6 rubs roller 9, whereby advance guide barrel 2 and cam ring 6 are connected so as to relatively movable. In this method, movement of cam ring 6 is regulatable in the axial direction if channel 7 is formed in the circumferential direction, and movement in the axial direction is possible if said channel 7 is spiral in configuration.

In all of the aforesaid connection methods, however, the connecting portions, which have complex configurations to anchor the cam ring 6 to the advance guide barrel 2, must have a configuration on the interior side such that cam ring 6 and/or advance guide barrel 2 are separated to some degree from the end section thereof, and thus the overall length of cam ring 6 and/or advance guide barrel 2 is elongated by said connecting portion. As a result, the overall length of the lens assembly is longer.

SUMMARY OF THE INVENTION

A main object of the present invention is to provide a lens assembly connecting two similar barrels via a simple mechanism. Another object of the present invention is to provide a lens assembly connecting two similar barrels without increasing overall length of said lens assembly.

One construction of the present invention achieving the aforesaid objects provides two mutually engagable barrels, wherein at least one of said barrel is provided with protruding connectors extending in the radial direction. When the two barrels are engaged, the aforesaid protruding connectors retract in the radial direction when they abut the other barrel. When engagement of the barrels is complete, the protruding connectors are restored from the retracted position so as to engage the other barrel and prevent the release of the barrels.

In another construction of the present invention, the aforesaid protruding connectors are formed at one end of one barrel.

In still another construction of the present invention, the aforesaid protruding connectors of the aforesaid constructions engage the end section of the other barrel.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIGS. 1A–1C are modal views showing the basic construction of a lens assembly of a first embodiment of the present invention;

FIGS. 4A–4C are a modal views showing conventional methods of engaging a cam ring and advance guide barrel;

FIGS. 6A–6C are a modal views showing a second embodiment of the present invention;

DETAILED DESCRIPTION OF THE PREFERRED EMBODIMENTS

Figure 2:
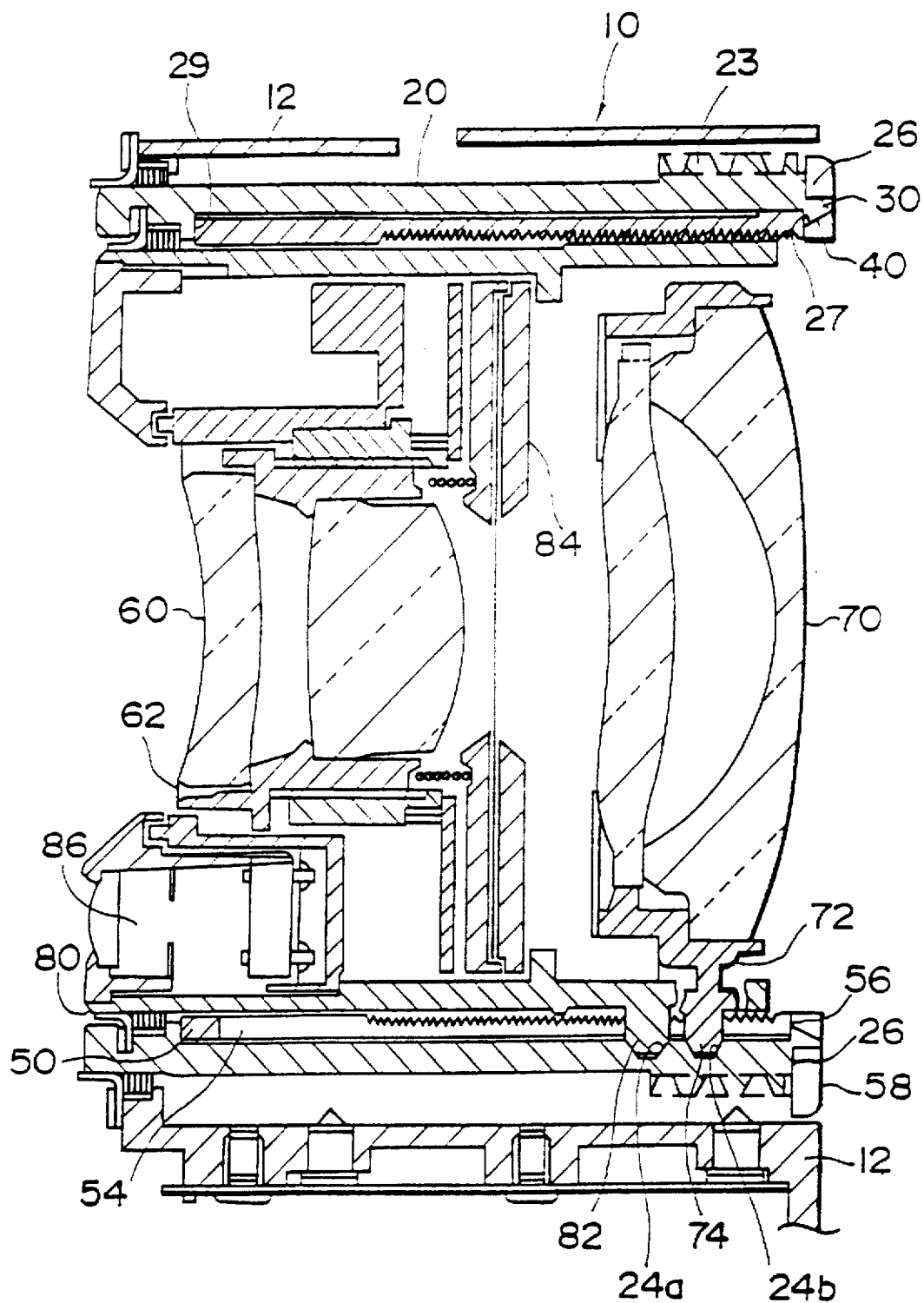
FIG. 2 is a section view of the lens assembly of the first embodiment.
Figure 3A:
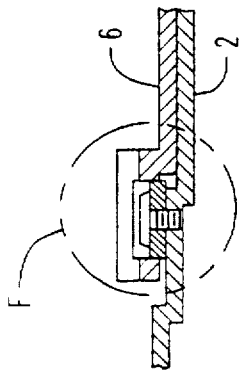
FIGS. 3A–3F are section views showing conventional methods of engaging a cam ring and advance guide barrel.
Figure 3B:
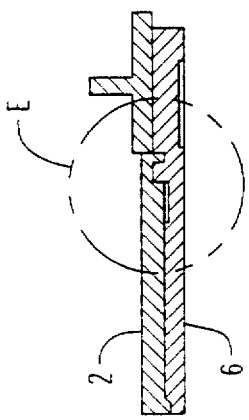
Figure 3C:
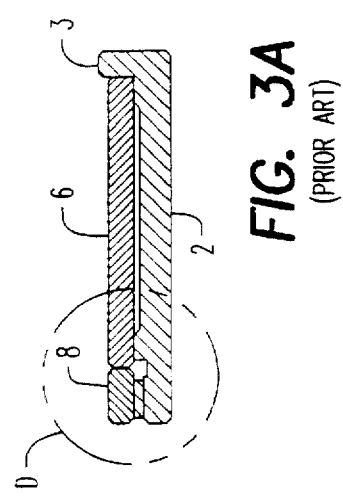
Figure 3D:
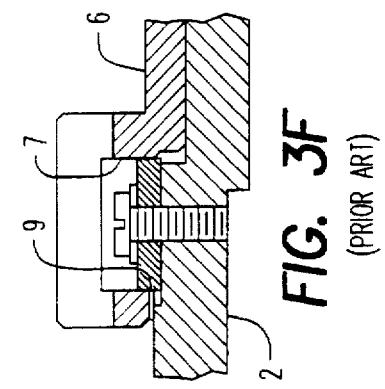
Figure 3E:
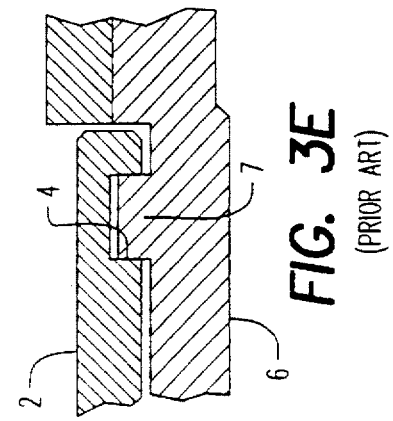
Figure 3F:
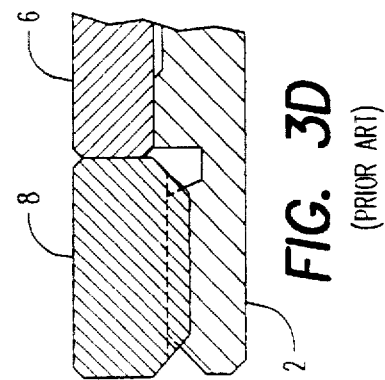

Lens assembly 10 of the first embodiment of the invention is described in detail hereinafter with reference to FIGS. 1A–1C and 2.

The lens assembly 10 of the first embodiment will be discussed first in terms of the basic construction of cam ring 20 and advance guide barrel 50 with reference to the modal illustration of FIG. 1. The front side of the lens assembly is disposed at the left side of the drawings.

Cam ring 20 comprises a through hole cam channel 24 of a predetermined configuration formed on a barrel-like body 22, as shown in (A) of FIG. 1. A connector member 30 extending in the axial direction is integratedly formed with body 22 at the back side of one end of said body 22. This connector member 30 extends backward from endface 26 of body 22, and a notch 28 is formed toward the front from said endface 26 of body 22 along side surface 32 of connector member 30. As a result, connector member 30 forms a long and narrow member in the axial direction, which is readily flexible in the radial direction. Connector member 30 is provided with a flange 40 which protrudes on the interior side in the radial direction of interior surface 34.

The interior endface 42 of flange 40 is a tapered surface which is inclined in the axial direction.

On the other hand, advance guide barrel 50 comprises a through hole advance guide channel 54 extending in the axial direction and formed on a barrel-like body 52, and a suitably number of individual locking members 58 having an L-shaped configuration with a bend of 90 degrees integratedly formed on endface 56 on the back side of body 52, as shown in FIG. 1B.

Cam ring 20 and advance guide barrel 50 are engaged by fitting the posterior side of cam ring 20 on exterior surface 53 of advance guide barrel 50 from the anterior side thereof, as shown in FIG. 1C. In the process during the aforesaid fitting of cam ring 20 and advance guide barrel 50, the flange 40 of connector member 30 of cam ring 20 is pushed while it abuts the exterior surface 53 of advance guide barrel 50, such that connector member 30 is flexed to the exterior side in the radial direction. Since the interior endface 42 of flange 40 of connector member 30 is inclined relative to the axial direction, the flange 40 is smoothly lifted above the exterior surface 53 of advance guide barrel 50. When cam ring 20 is completely fitted on advance guide barrel 50, the flexed connector member 30 of cam ring 20 is restored to the interior side of the radial direction via its elasticity, such that flange 40 of connector member 30 engages the endface 56 of advance guide barrel 50. That is, the anterior surface 44 of flange 40 of connector member 30 abuts the endface 56 of advance guide barrel 50. The anterior surface 44 of flange 40 extends at a right angle to the axis, and prevents cam ring 20 from moving in an opposite direction to the engagement direction, such that cam ring 20 does not slip off from advance guide barrel 50. On the other hand, at the same time the endface 26 of cam ring 20 abuts locking member 58 of advance guide barrel 50, such that cam ring 20 cannot be fitted on advance guide barrel 50 beyond said locking member 58. Accordingly, cam ring 20 engages advance guide barrel 50 so as to be incapable of moving in the axial direction. In this state of engagement, cam ring 20 is capable of rotating relative to advance guide barrel 50 within a predetermined range until connector member 30 of cam ring 20 abuts locking member 58 of advance guide barrel 50, as indicated by arrow 90 in the drawing. When cam ring 20 and advance guide barrel 50 are in an engaged state as described above, they are fitted in stationary barrel 12 from the front. Advance guide channels 12A are formed at three locations on the interior surface of stationary barrel 12 and extend in the axial direction, and the rotation of advance guide barrel 50 is regulated by the aforesaid locking member 58 engaging said advance guide channel 12A so as to permit advancement only.

Specific construction of lens assembly 10 are described hereinafter with reference to the section view of FIG. 2.

Lens assembly 10 comprises a cam ring 20 and advance guide barrel 50 engaged as previously described and housed within a stationary barrel 12, and an advance guide barrel 80 supporting a first lens unit 60 and a second support frame 72 holding a second lens unit 70 accommodated therein.

A gear 23 is formed on the exterior surface of cam ring 20, said gear 23 engages a zoom drive gear (not illustrated) provided between stationary barrel 12 and cam ring 20, so as to allow rotation of cam ring 20. On the other hand, the advance guide barrel 50 is stationary with stationary barrel 12. The connector member 30 of cam ring 20 is used to engage cam ring 20, and advance guide member 50 is formed so as to be relatively smaller on the interior surface 27 side at the posterior side of cam ring 20, as shown in FIG. 2. A second surface 42 of flange 40 formed on connector member 30 abuts the back endface 56 of advance guide barrel 50. On the other hand, the anterior side of interior surface 27 of cam ring 20 is provided with a shoulder member 29 drawn to the interior side, and the interior side endface 57 of advance guide barrel 50 abuts said shoulder member 29. Since cam ring 20 circumscribes advance guide barrel 50 in the axial direction via said shoulder member 29 and connector member 30, the axial direction movement of cam ring 20 relative to advance guide barrel 50 can be regulated. Cam ring 20 is provided with two types of cam channels 24a and 24b for the first lens unit 60 and the second lens unit 70, said cam channels being provided at suitable positions.

A pin 82 protrudes from the exterior surface of advance barrel 80. Pin 82 engages the first cam channel 24a of cam ring 20 and the guide channel 54 of advance guide barrel 50, so as to allow advance barrel 80 to move in the direction of the optical axis in conjunction with the rotation of cam ring 20 relative to advance guide barrel 50. The interior side of advance guide barrel 80 is provided with a shutter unit 84 and focusing unit 86, and a first lens unit 60 supported by a first support frame 62. The focusing unit 86 accomplishes focusing by moving the first support frame 62 relative to advance barrel 80 in the direction of the optical axis. The exterior surface of second support frame 72 supporting the second lens unit 70 is provided with a pin 74 which engages the second cam channel 24b of cam ring 20 and the guide channel 54 of advance guide barrel 50, so as to allow movement of the second support frame 72 in the direction of the optical axis in conjunction with the rotation of cam ring 20 relative to advance guide barrel 50.

Figure 5:
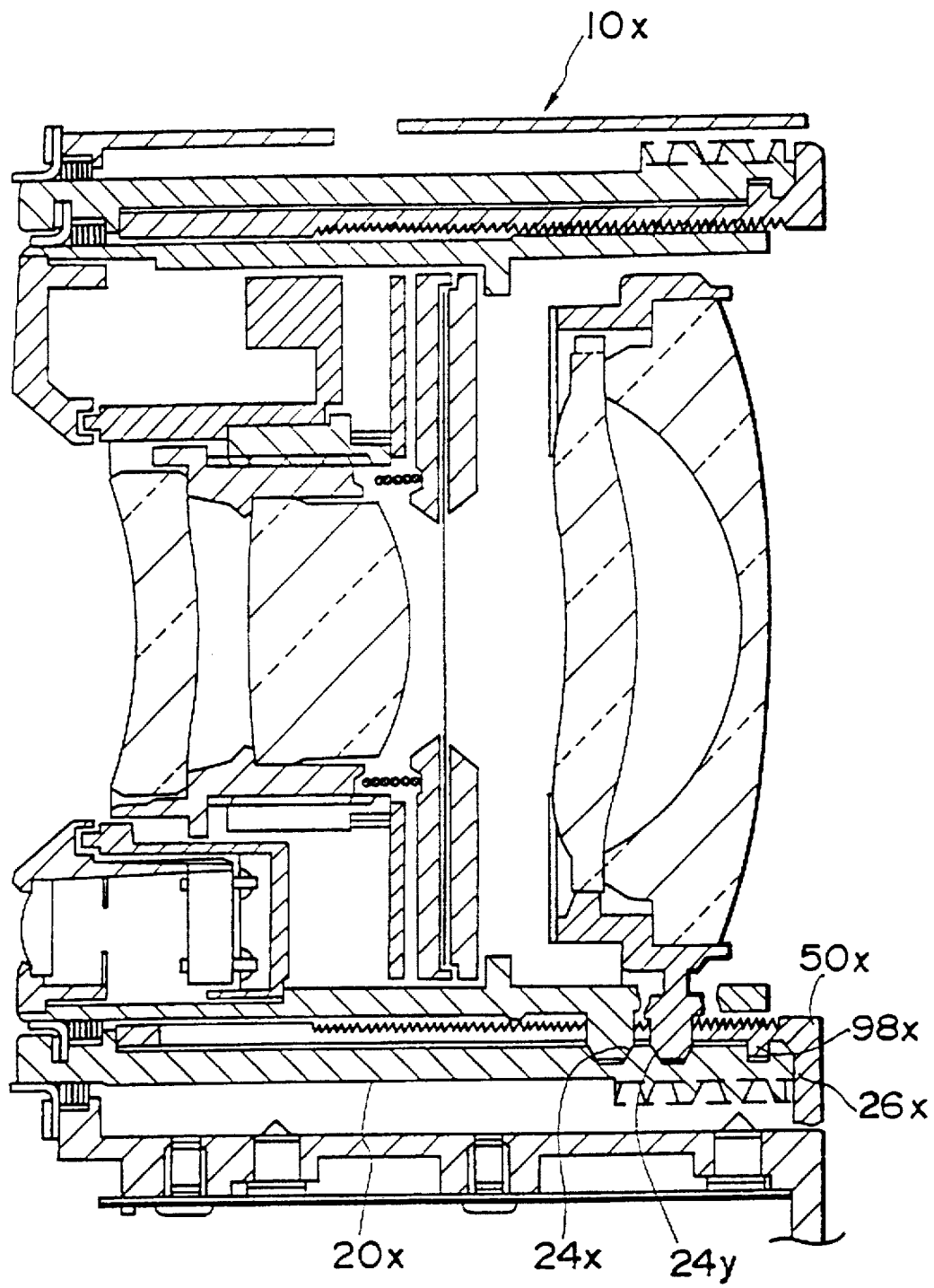
FIG. 5 is a section view of a conventional lens assembly.

The lens assembly 10 having the previously described construction can have a shorter overall length compared to conventional lens assemblies. For example, in a conventional zoom lens assembly 10x using a bayonet fitting of a cam ring 20x and advance guide barrel 50x as shown in FIG. 5, a bayonet member 98x is formed in near proximity to the endface 26x of cam ring 20x, thereby increasing the distance between the terminal end of cam channels 24x and 24y of cam ring 20x and the endface 26x of cam ring 20x, and requiring the formation of a bayonet member 98x therebetween. In contrast, in the lens assembly 10 having the construction shown in FIG. 2, a connector member 30 is formed near the endface 26 of cam ring 20 and extends within a range to stop advance guide barrel 50, such that a connector member is not required between the terminal end of cam channels 24a and 24b of cam ring 20 and the endface 26 of cam ring 20. Thus, cam ring 20 can be shortened.

Accordingly, lens assembly 20 having the previously described construction allows cam ring 20 and advance guide barrel 50 to be connected via a simple construction and without increasing its overall length.

A lens assembly of a second embodiment of the present invention is described hereinafter with reference to FIGS. 6A–6C.

The front side of the lens assembly is disposed at the left side of the drawings.

Advance ring 120 comprises an advance guide channel 124 formed on a barrel-like body 122, as shown in FIG. 6A. A connector member 130 extending in the axial direction is integratedly formed with body 122 at the back side of one end of said body 122. This connector member 130 extends backward from endface 126 of body 122, and a notch 128 is formed toward the front from said endface 126 of body 122 along side surface 132 of connector member 130. As a result, connector member 130 forms a long and narrow member in the axial direction, which is readily flexible in the radial direction. Connector member 130 is provided with a flange 140 which protrudes on the interior side in the radial direction of exterior surface 134.

The interior endface 142 of flange 140 is a tapered surface which is inclined in the axial direction.

On the other hand, cam barrel 150 comprises a cam channel 154 having a predetermined inclination and extending in the axial direction and formed on a barrel-like body 152, and a suitable number of individual locking members 158 having an L-shaped configuration with a bend of 90 degrees integratedly formed on endface 156 on the back side of body 152, as shown in FIG. 6B.

Advance ring 120 and cam barrel 150 are engaged by fitting the posterior side of advance ring 120 on interior surface 153 of cam barrel 150 from the posterior side thereof, as shown in FIG. 6C. In the process during the aforesaid fitting of advance ring 120 and cam barrel 150, the flange 140 of connector member 130 of advance ring 120 is pushed while it abuts the interior surface 153 of cam barrel 150, such that connector member 130 is flexed to the interior side in the radius direction. Since the exterior endface 142 of flange 140 of connector member 130 is inclined relative to the axial direction, the flange 140 is smoothly lifted above the interior surface 153 of cam barrel 150. When advance ring 120 is completely fitted on cam barrel 150, the flexed connector member 130 of advance ring 120 is restored to the exterior side of the radius direction via its elasticity, such that flange 140 of connector member 130 engages the endface 156 of cam barrel 150. That is, the anterior surface 144 of flange 140 of connector member 130 abuts the endface 156 of cam barrel 150. The anterior surface 144 of flange 140 extends at a right angle to the axis, and prevents advance ring 120 from moving in an opposite direction to the engagement direction, such that advance ring 120 does not slip off from cam barren 150. On the other hand, at the same time the endface 126 of advance ring 120 abuts locking member 158 of cam barrel 150, such that advance ring 120 cannot be fitted on cam barrel 150 beyond said locking member 158. Accordingly, advance ring 120 engages cam barrel 150 so as to be incapable of moving in the axial direction. In this state of engagement, cam barrel 150 is capable of rotating relative to advance barrel 120 within a predetermined range until connector member 130 of advance ring 120 abuts locking member 158 of cam barrel 150, as indicated by arrow 190 in the drawing.

The present invention is not limited to the previously described embodiments inasmuch as other types of embodiments are possible. For example, the connector member may be formed at the anterior end of the barrel.

It will be appreciated by those of ordinary skill in the art that the present invention can be embodied in other forms without departing from the spirit or essential characteristics thereof. The presently disclosed embodiments are considered in all respects to be illustrative and not restrictive. The scope of the invention is indicated by the appended claims, rather than the foregoing description, and all changes which come within the meaning and range of equivalents thereof are intended to be embraced therein.

What is claimed is:

1. A lens assembly comprising:
   an outer barrel;
   an inner barrel which is inserted in said outer barrel;
   a plurality of lenses, all of said lenses being movable substantially along an axial barrel direction when at least one of said outer barrel and said inner barrel is rotated; and
   said inner barrel including an interlocking portion which extends toward the outside of said inner barrel;
   wherein said interlocking portion is so constructed that, when said inner barrel is inserted in said outer barrel, said interlocking portion is elastically bent toward the inner direction thereby allowing the insertion and, after completion of the insertion, said interlocking portion returns towards the outer direction thereby preventing the barrels from being removed.

2. A lens assembly as claimed in claim 1, wherein said interlocking portion includes a pawl extending toward outside said inner barrel and an elastic portion which elastically holds the pawl.

3. A lens assembly as claimed in claim 1, wherein said interlocking portion is provided in an end portion of said inner barrel.

4. A lens assembly as claimed in claim 3, wherein said interlocking portion interlocks with an end face of said outer barrel.

5. A lens assembly as claimed in claim 1, wherein said outer barrel includes a stopper which engages with said interlocking portion when said barrels are rotated with each other so as to restrict the respective rotatable range.

6. A lens assembly comprising:
   an outer barrel;
   an inner barrel which is inserted in said outer barrel;
   a plurality of lenses, all of said lenses being movable substantially along an axial barrel direction when at least one of said outer barrel and said inner barrel is rotated; and
   said outer barrel including an interlocking portion which extends toward the inside of said outer barrel;
   wherein said interlocking portion is so constructed that, when said inner barrel is inserted in said outer barrel, said interlocking portion is elastically bent toward the outer direction thereby allowing the insertion and, after completion of the insertion, said interlocking portion returns toward the inner direction thereby preventing the barrels from being removed.

7. A lens assembly as claimed in claim 6, wherein said interlocking portion includes a pawl extending toward inside said outer barrel and an elastic portion which elastically holds the pawl.

8. A lens assembly as claimed in claim 6, wherein said interlocking portion is provided in an end portion of said outer barrel.

9. A lens assembly as claimed in claim 8, wherein said interlocking portion interlocks with an end face of said inner barrel.

10. A lens assembly as claimed in claim 6, wherein said inner barrel includes a stopper which engages with said interlocking portion when said barrels are rotated with each other so as to restrict the respective rotatable range.

11. A lens assembly as claimed in claim 10 further comprising a third barrel which is fitted outside said outer barrel.

12. A lens assembly as claimed in claim 11, wherein said third barrel includes a groove in which said stopper so as to guide relative movement of said inner barrel and said third barrel.

13. A lens assembly comprising:
   a pair of barrels which are relatively fitted so as to move at least one optical unit;
   one of the barrels includes a first stopper portion to prevent the other of the barrels from being removed from said one of the barrels in one direction along an optical axis of the lens assembly, said first stopper portion substantially located at an end face of said one barrel and substantially adjacent to an end face of the other of said barrels; and
   a second stopper portion provided in said one of the barrels so as to prevent said other of the barrels from being removed from said one of the barrels in an opposite direction along the optical axis;
   wherein said one of said stopper portions is to be elastically bent toward a direction for disengaging said one of stopper portions from said end of said other of the barrels in order to allow relative insertion of the barrels.

14. A lens assembly as claimed in claim 13, wherein said stopper portions prevents the barrels from being removed with allowing them to rotate with each other.

15. A lens assembly comprising:
a first and second barrel, each of said barrels having a cylindrical exterior surface and an end face, said barrels being substantially concentrically positioned with respect to each other;
said first barrel having an elastically bendable interlocking portion substantially located at said end face of said first barrel, said interlocking portion having a surface substantially adjacent to said end face of said second barrel for preventing said first and second barrels from moving with respect to each other in an axial barrel direction; and
an optical unit movable along an optical axis when at least one of said barrels is rotated.

16. A lens assembly comprising:
an outer barrel;
an inner barrel which is inserted in said outer barrel and has a groove, the groove having two closed ends;
an optical unit which is provided inside said lens assembly so as to be moved by means of said groove of said inner barrel when at least one of said outer barrel and said inner barrel is moved; and
an interlocking portion, provided in said inner barrel and extending toward the outside of said inner barrel, said interlocking portion has an elasticity by a pair of notches, said notches distinct from said groove;
wherein said interlocking portion is so constructed that, when said inner barrel is inserted in said outer barrel, said interlocking portion is elastically bent toward the inner direction thereby allowing the insertion and, after completion of the insertion, said interlocking portion returns toward the outer direction thereby preventing the barrels from being removed.

17. A lens assembly as claimed in claim 16, wherein said interlocking portion includes a pawl extending toward outside said inner barrel and an elastic portion which elastically holds the pawl.

18. A lens assembly as claimed in claim 16, wherein said interlocking portion is provided in an end portion of said inner barrel.

19. A lens assembly as claimed in claim 18, wherein said interlocking portion interlocks with an end face of said outer barrel.

20. A lens assembly as claimed in claim 16, wherein said outer barrel includes a stopper which engages with said interlocking portion when said barrels are rotated with each other so as to restrict the respective rotatable range.

21. A lens assembly comprising:
an outer barrel which has a groove;
an inner barrel which is inserted in said outer barrel;
an optical unit which is provided inside said lens assembly so as to be moved by means of said groove of said outer barrel when at least one of said outer barrel and said inner barrel is moved; and
an interlocking portion, provided in said outer barrel and extending toward the inside of said outer barrel, said interlocking portion has an elasticity by a pair of notches distinct from said groove;
wherein said interlocking portion is so constructed that, when said inner barrel is inserted in said outer barrel, said interlocking portion is elastically bent toward the outer direction thereby allowing the insertion and, after completion of the insertion, said interlocking portion returns toward the inner direction thereby preventing the barrels from being removed.

22. A lens assembly as claimed in claim 21, wherein said interlocking portion includes a pawl extending toward inside said outer barrel and an elastic portion which elastically holds the pawl.

23. A lens assembly as claimed in claim 21, wherein said interlocking portion is provided in an end portion of said outer barrel.

24. A lens assembly as claimed in claim 23, wherein said interlocking portion interlocks with an end face of said inner barrel.

25. A lens assembly as claimed in claim 21, wherein said inner barrel includes a stopper which engages with said interlocking portion when said barrels are rotated with each other so as to restrict the respective rotatable range.

26. A lens assembly as claimed in claim 25 further comprising a third barrel which is fitted outside said outer barrel.

27. A lens assembly as claimed in claim 26, wherein said third barrel includes a groove in which said stopper so as to guide relative movement of said inner barrel and said third barrel.

28. A lens assembly comprising:
a pair of lens barrels which are relatively fitted so as to move at least one optical unit; and
one of the barrels includes a first stopper portion to prevent the other of the barrels from being removed from said one of the barrels in one direction along an optical axis of the lens assembly and a second stopper portion to prevent said other of the barrels from being removed from said one of the barrels in an opposite direction along the optical axis, said first stopper portion and the second stopper portion are substantially located at the same end portion of said one of the barrels;
wherein said one of said stopper portions is to be elastically bent toward a direction for disengaging said one of stopper portions from said other of the barrels in order to allow relative insertion of the barrels.

29. A lens assembly as claimed in claim 28, wherein said stopper portions prevents the barrels from being removed with allowing them to rotate with each other.

30. A lens assembly comprising:
a pair of lens barrels which are relatively fitted so as to move at least one optical unit;
a first stopper portion provided in one of said barrels so as to prevent the other of the barrels from being removed from said one of the barrels in one direction along an optical axis of the lens assembly;
a second stopper portion provided in said other of the barrels so as to prevent said other of the barrels from being removed from said one of the barrels in an opposite direction along the optical axis; and
a third lens barrel into which said pair of lens barrels are inserted, said third lens barrel is provided with a groove;
wherein said one of said stopper portions is to be elastically bent toward a direction for disengaging said one of stopper portions from said other of the barrels in order to allow relative insertion of the barrels,
and wherein said second stopper portion is fitted in said groove so as to guide said other of the barrels in a direction along an optical axis.

31. A lens assembly as claimed in claim 30, wherein said stopper portions prevents the barrels from being removed with allowing them to rotate with each other.

* * * * *